F. R. McBERTY.
CRYPTOGRAPH MACHINE.
APPLICATION FILED AUG. 24, 1907.
984,832.
Patented Feb. 21, 1911.
2 SHEETS—SHEET 1.
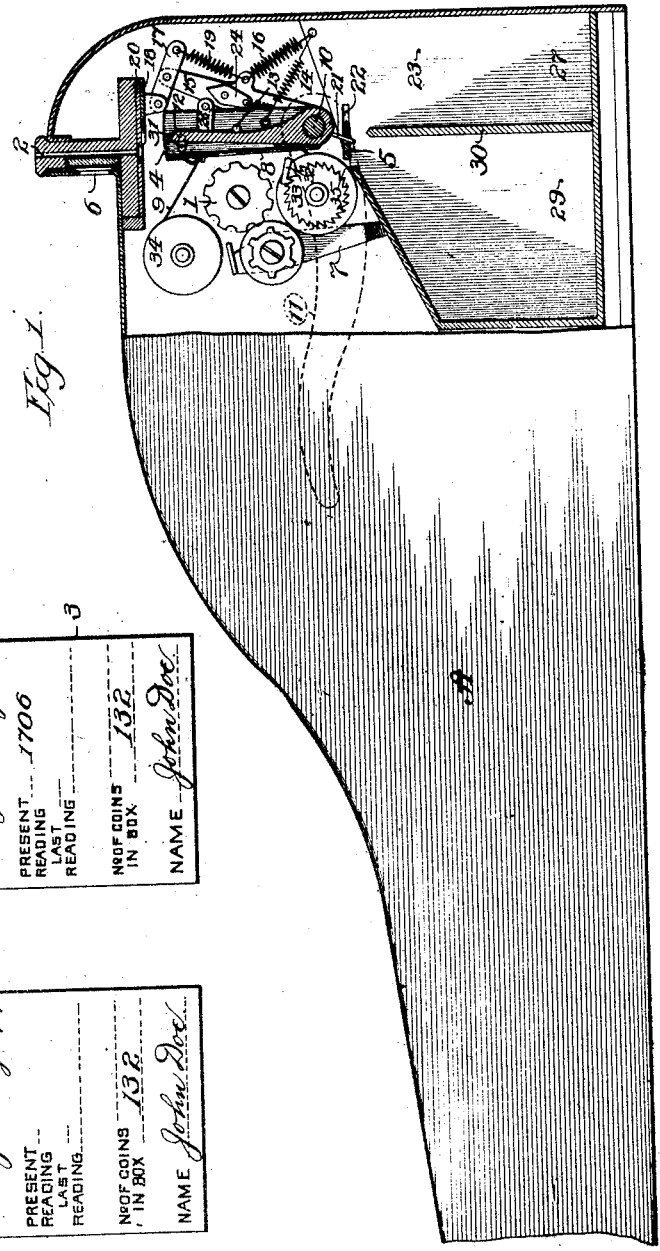
Witnesses:
Inventor:
Frank R. McBerty.
By Barton, Tanner & Folk
Attys.

F. R. McBERTY.
CRYPTOGRAPH MACHINE.
APPLICATION FILED AUG. 24, 1907.
984,832.
Patented Feb. 21, 1911.
2 SHEETS—SHEET 2.
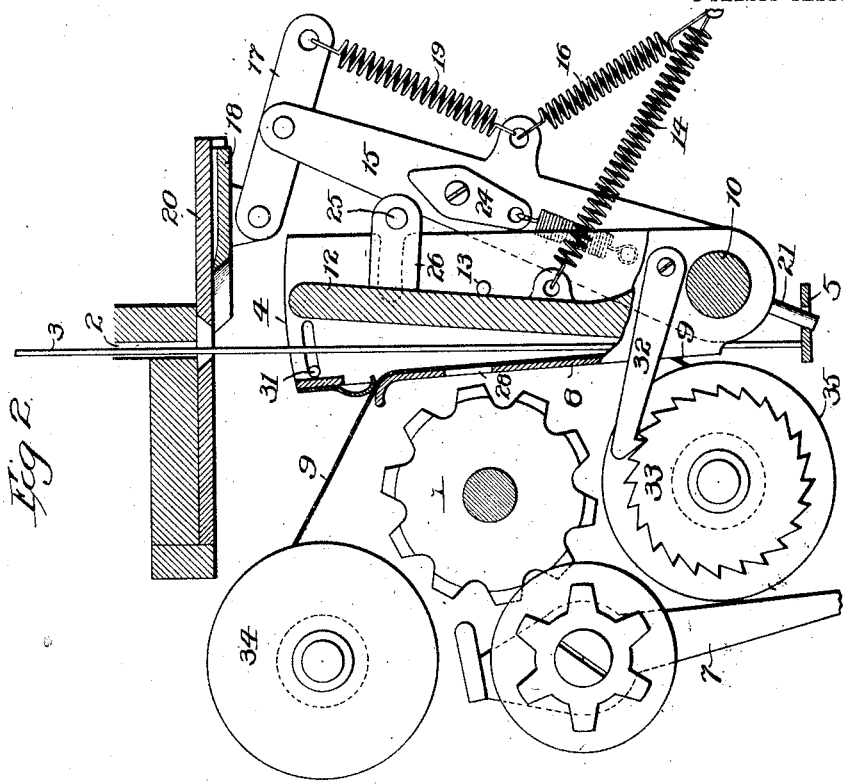
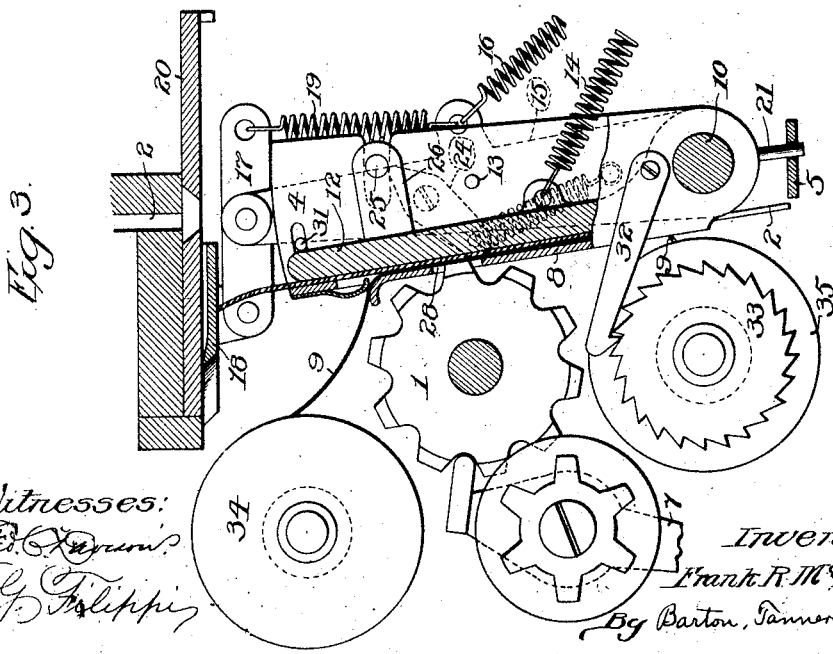
Witnesses:
Inventor:
Frank R. McBerty
By Barton, Tanner & Folk
Attys

UNITED STATES PATENT OFFICE.

FRANK R. McBERTY, OF NEW ROCHELLE, NEW YORK, ASSIGNOR TO WESTERN ELECTRIC COMPANY, OF CHICAGO, ILLINOIS, A CORPORATION OF ILLINOIS.

CRYPTOGRAPH-MACHINE.

984,832.    Specification of Letters Patent.    Patented Feb. 21, 1911.

Application filed August 24, 1907. Serial No. 389,938.

*To all whom it may concern:*

Be it known that I, FRANK R. McBERTY, citizen of the United States, residing at New Rochelle, in the county of Westchester and State of New York, have invented a certain new and useful Improvement in Cryptograph-Machines, of which the following is a full, clear, concise, and exact description.

My invention relates to a cryptograph machine, and more particularly to a machine for translating a cipher or code reading, representing numerical values, into the ordinary decimal system of notation.

The object of my invention is to conceal the translation from the operator, and to prevent the code reading and the translation from appearing together, thus rendering impossible any unauthorized attempt at deciphering the code.

While other uses of my invention may readily suggest themselves, I will describe it as embodied in and forming a part of a system of coin collection, somewhat as follows: Each coin actuated mechanism, as, for example, a coin collector at a telephone pay station, is equipped with a counter which gives a code reading instead of the usual reading in Arabic numerals. The collecting agent on his tour would collect the cash and note on a ticket or card the amount thereof, the number of the box and the code reading. The tickets would finally be turned in at the general office and the readings be deciphered by means of any desired form of translating mechanism, such, for example, as that forming the subject matter of the copending application of Newman H. Holland, Serial No. 361,017 filed March 28, 1907. By employing such a machine, it is unnecessary that the person deciphering the translation be familiar with the code. For example, if the code reading is B R N S, by merely operating the corresponding keys, the translation 1706 will be registered.

It is a particular feature of my invention that the translation of the code reading is concealed from the operator. As a still further precaution, my invention further provides that the stub containing the code reading is severed from the part on which the translation is printed and the two parts are deposited in separate receptacles.

The specific mechanism for accomplishing the functions above pointed out is not my invention, but I have shown the same as constituting the preferred embodiment of my invention, broadly speaking.

My invention may be more readily understood by reference to the accompanying drawings, and its scope determined from the appended claims.

Referring to the drawings:—Figure 1 is a side elevation, partly in section, of a machine embodying my invention; Figs. 2 and 3 are enlarged fragmentary sectional views of the printing and cutting mechanisms in normal and operated positions, respectively; Fig. 4 is a view of the card as it appears before insertion in the machine; and Fig. 5 is a view of the card after the translation has been printed, and the stub severed.

Like parts are designated by similar letters of reference throughout the several views.

A represents the casing of the machine. In Fig. 1, a portion of this casing is broken away or shown in section to show the relative location of the mechanism embodying my particular invention. As before stated, any suitable mechanism may be used for setting the registering mechanism 1, which may consist of the ordinary digits disks common to such mechanism. For sake of clearness, I have omitted all illustration of the means used in operating said registering mechanism, since said means form no part of my particular invention.

It will be observed that the registering mechanism 1 lies within the casing A, and hence is concealed from the operator of the machine. The casing is provided with an aperture 2 for receiving the card 3. Said card extends through a carrier 4, rests upon a platform 5, and is held in such position that the code letters on the stub of the card are visible through a window 6. The operator can then manipulate the translating mechanism to register the translation on the disks 1. Said disks are locked in their set position by a lever 7, a projection of which enters notches on the peripheries of the digit wheels, as shown in Fig. 3, thus holding said wheels in their set position during the act of printing the translation of the code. The carrier 4 is U-shaped in cross-section, and is open at each end, the bottom of the U forming a ribbon plate 8 for the type ribbon 9. Said carrier is loosely mounted at its lower end upon a rocking shaft 10, which is adapted to be rocked by means of a lever or handle 11. Inside the channel of the carrier 4 is a platen 12. Said platen is loosely pivoted on the shaft 10 and is normally held against a pin or stop 13 by a spring 14.

A lever 15 is fixed at its lower end to the shaft 10, at the side of the carrier 4. By the depression of the operating handle 11, the lever 15 is drawn forward. A spring 16 serves to hold the lever 15, the shaft 10 and the handle 11 in the position shown in Figs. 1 and 2 and to restore the parts to their initial positions after the operation thereof. Pivoted at the upper end of the lever 15 is a lever 17, which carries a knife 18. Said knife is held by the spring 19 against the plate 20, through an opening in which the card 3 extends. A pin 21 on the shaft 10 projects through a hole in the platform 5, so that the platform is reciprocated by the rocking of the shaft 10. Said platform may be mounted in any suitable manner, as for example, in a slot 22 in a partition 23. When the handle 11 is depressed, the shaft 10 is rocked, thus starting the knife 18 forward and the platform 5 backward. Upon further rotation of the shaft 10, a pivoted finger 24, under spring tension, engages a pin 25, carried by a rearward projection 26 of the platen 12, thus moving the platen forward. A slot is provided in the carrier 4 for the pin 25. The stub of the card 3 containing the code cipher is next severed by the knife and drops down back of the platen into a receptacle 27. The body of the ticket 3 is clamped by the platen 12 against the ribbon plate 8 and said parts are then rotated until the type on the registering wheels 1 project through a transverse slot 28 and prints the translation on the card, the card so printed and severed being shown in Fig. 5. A further forward movement of the lever 15 allows the finger 24 to pass underneath the pin 25, whereupon the platen 12 is drawn back by the spring 14, thus releasing the card 3. The platform 5, upon which the card rested when inserted through the opening 2, is now clear, having been moved back by the pin 21. The printed card now drops into a receptacle 29, said receptacle being separated from the receptacle 27 by a partition 30. The spring 14 returns the platen 12 and the carrier 4 against their respective stops 13 and 31.

Pivoted to the carrier 4 is a pawl 32 which engages a ratchet wheel 33 and provides a convenient means for automatically feeding the ribbon 9 across the plate 8 from the reel 34 onto the reel 35 in a manner readily understood from Figs. 2 and 3.

As before stated, when the handle 11 is released, the parts which have not been already returned to their normal positions, as above described, are restored by the spring 16.

Since the upper part or stub of the card bears the code reading and the lower part the translation, and the ticket is severed in the action of printing said translation, it will be noted that a code reading and its translation never appear together except to those who may have access to the receptacles of the translating machine. Hence, opportunities for a leakage of the code are practically eliminated.

Having described mechanism embodying my invention, I claim as my own invention:—

1. In a translating machine, a casing therefor adapted to receive a ticket bearing a code reading, means for printing the translation of said code reading on a concealed portion of the ticket, and means for severing the portion of the ticket bearing the code reading from the portion bearing the printed translation and causing the two portions to be deposited in separate receptacles.

2. In a translating machine, a casing provided with an aperture for the insertion of a ticket bearing a code reading, wheels adapted to print a translation of said code reading on a concealed portion of the ticket, means for bringing said ticket into printing engagement with said wheels, a cutter mechanism adapted to sever the portion of the ticket bearing the code reading from the portion bearing the printed translation, and means for directing the two portions of said ticket into separate receptacles.

3. In a translating machine, a casing adapted to receive a ticket bearing a code reading, wheels adapted to print a translation of said code reading on a concealed portion of said ticket, a movable platen for bringing said ticket into printing engagement with said wheels, a cutter mechanism adapted to sever the portion of the ticket bearing the code reading and means operating automatically in the movement of said platen and cutter mechanism to direct the two parts of the ticket into separate receptacles.

In witness whereof, I have hereunto subscribed my name this 3rd day of August A. D. 1907.

FRANK R. McBERTY.

Witnesses:
EDWIN H. SMYTHE,
CAROLINE E. DAVIDSON.